(12) United States Patent
Sheridan et al.

(10) Patent No.: US 8,640,336 B2
(45) Date of Patent: Feb. 4, 2014

(54) OIL BAFFLE FOR GAS TURBINE FAN DRIVE GEAR SYSTEM

(75) Inventors: William G. Sheridan, Southington, CT (US); Michael E. McCune, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 23 days.

(21) Appl. No.: 13/346,790

(22) Filed: Jan. 10, 2012

(65) Prior Publication Data

US 2012/0121378 A1 May 17, 2012

Related U.S. Application Data

(60) Continuation of application No. 12/718,436, filed on Mar. 5, 2010, now Pat. No. 8,276,275, which is a division of application No. 11/481,112, filed on Jul. 5, 2006, now Pat. No. 7,704,178.

(51) Int. Cl.
*B21K 25/00* (2006.01)
(52) U.S. Cl.
USPC ......... 29/889.22; 29/889; 29/889.2; 415/142; 475/159; 475/331; 475/346
(58) Field of Classification Search
USPC ............ 29/889, 889.2, 889.22; 475/159, 331, 475/346; 74/468; 415/142
See application file for complete search history.

(56) References Cited

U.S. PATENT DOCUMENTS

| | | | |
|---|---|---|---|
| 2,591,743 A | 4/1952 | Thompson | |
| 3,650,353 A | 3/1972 | Abbott | |
| 3,853,432 A | 12/1974 | Cronstedt | |
| 4,271,928 A | 6/1981 | Northern | |
| 4,378,711 A | 4/1983 | Daniel | |
| 4,827,712 A | 5/1989 | Coplin | |
| 4,914,904 A | 4/1990 | Parnes | |
| 5,391,125 A | 2/1995 | Turra et al. | |
| 5,433,674 A * | 7/1995 | Sheridan et al. | 475/346 |
| 5,466,198 A | 11/1995 | McKibbin et al. | |
| 5,472,383 A | 12/1995 | McKibbin | |
| 6,158,210 A | 12/2000 | Orlando | |
| 6,223,616 B1 * | 5/2001 | Sheridan | 74/468 |

(Continued)

FOREIGN PATENT DOCUMENTS

| | | |
|---|---|---|
| DE | 3410977 | 9/1985 |
| EP | 1783344 | 12/2009 |
| EP | 2559913 | 2/2013 |
| JP | 6-1889 | 1/1994 |

(Continued)

OTHER PUBLICATIONS

Extended European Search Report for application No. EP 07 25 2647, dated Jan. 25, 2011.

(Continued)

*Primary Examiner* — Richard Chang
(74) *Attorney, Agent, or Firm* — Carlson, Gaskey & Olds P.C.

(57) ABSTRACT

An exemplary turbine engine assembly includes a first shaft that is rotatably driven by a second shaft of a gas turbine engine and a compressor hub driven by the first shaft. The compressor hub is within a compressor section of the gas turbine engine. An epicyclic gear train is driven by the first shaft. A common attachment point secures the first shaft and the compressor hub to the second shaft.

24 Claims, 5 Drawing Sheets

(56) References Cited

U.S. PATENT DOCUMENTS

| | | |
|---|---|---|
| 6,905,303 B2 * | 6/2005 | Liu et al. .................. 415/142 |
| 7,011,599 B2 | 3/2006 | Becquerelle et al. |
| 7,033,301 B2 | 4/2006 | Kimes |
| 7,104,918 B2 | 9/2006 | Mitrovic |
| 7,112,157 B2 | 9/2006 | Uebbing |
| 7,214,160 B2 | 5/2007 | Illerhaus |
| 7,490,460 B2 | 2/2009 | Moniz et al. |
| 7,704,178 B2 * | 4/2010 | Sheridan et al. .............. 475/159 |
| 2005/0026744 A1 | 2/2005 | Illerhaus et al. |
| 2009/0111639 A1 | 4/2009 | Klingels |

FOREIGN PATENT DOCUMENTS

| | | |
|---|---|---|
| JP | 2001-208146 | 8/2001 |
| JP | 2005-163666 | 6/2005 |
| JP | 2005-207472 | 8/2005 |
| WO | 2007054066 | 5/2007 |

OTHER PUBLICATIONS

European Search Report for European Patent Application No. 12180834.9 Completed Dec. 7, 2012.

* cited by examiner

OIL BAFFLE FOR GAS TURBINE FAN DRIVE GEAR SYSTEM

REFERENCE TO RELATED APPLICATIONS

This application is a continuation of U.S. patent application Ser. No. 12/718,436, which was filed on 5 Mar. 2010. U.S. patent application Ser. No. 12/718,436 is a divisional of U.S. Pat. No. 7,704,178, which was filed on 5 Jul. 2006.

BACKGROUND OF THE INVENTION

This disclosure relates to a gas turbine engine architecture.

Gas turbine engines typically employ an epicyclic gear train connected to a turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

The epicyclic gear train gears must receive adequate lubrication during operation of the turbine engine. To this end, the carrier includes oil spray bars arranged between the intermediate gears and the sun gear to spray oil directly on those gears. Separate oil baffles, which may be integral with or separate from the carrier, are arranged between the intermediate gears to collect the sprayed oil and retain it in the area of the intermediate gears for prolonged lubrication before the oil is collected in a lubricant gutter associated with the ring gear.

Prior art carrier arrangements have required multiple components and complicated assembly in order to accommodate the oil baffles. For example, one or both of the side walls of the carrier must be assembled around the intermediate gears resulting in a multi-piece carrier. Furthermore, separate oil spray bars and oil baffles complicate assembly and increase cost. What is needed is a simplified oil baffle and spray bar arrangement that enables a simpler and less expensive carrier design.

SUMMARY OF THE INVENTION

A turbine engine assembly according to an exemplary embodiment of the present disclosure includes, among other things, a first shaft that is rotatably driven by a second shaft of a gas turbine engine, and a compressor hub driven by the first shaft. The compressor hub is within a compressor section of the gas turbine engine. An epicyclic gear train is driven by the first shaft. A common attachment point secures the first shaft and the compressor hub to the second shaft.

In a further non-limiting embodiment of the foregoing turbine engine assembly, the turbine engine includes an epicyclic gear train that has a carrier and sun gear. Intermediate gears are arranged about, and intermesh with, the sun gear. The intermediate gears are supported by the carrier.

In a further non-limiting embodiment of either of the foregoing gas turbine engine assemblies, the gas turbine engine includes a baffle secured to the carrier by a fastening member. The baffle includes a lubrication passage near at least one of the sun gear and intermediate gears for directing a lubricant on the at least one of the sun gear and intermediate gears.

In a further non-limiting embodiment of any of the foregoing gas turbine engine embodiments, the turbine engine assembly includes a ring gear intermeshing with the intermediate gears and a third shaft interconnected to the ring gear. The first shaft is interconnected to the sun gear.

In a further non-limiting embodiment of any of the foregoing gas turbine engine embodiments, the carrier is fixed relative to a housing, the third shaft drives a turbo fan, and the first shaft supports a compressor hub having compressor blades.

In a further non-limiting embodiment of any of the foregoing gas turbine engine embodiments, the first shaft is a compressor shaft.

In a further non-limiting embodiment of any of the foregoing gas turbine engine embodiments, the epicyclic gear train rotatably drives a third shaft.

In a further non-limiting embodiment of any of the foregoing gas turbine engine embodiments, the turbine engine includes roller bearings that support the third shaft.

In a further non-limiting embodiment of any of the foregoing gas turbine engine embodiments, the third shaft is a fan shaft.

In a further non-limiting embodiment of any of the foregoing gas turbine engine embodiments, the second shaft is turbine shaft.

In a further non-limiting embodiment of any of the foregoing gas turbine engine embodiments, the compressor hub includes blades.

In a further non-limiting embodiment of any of the foregoing gas turbine engine embodiments, torque is transferred to the first shaft and the compressor hub exclusively through the common attachment point.

In a further non-limiting embodiment of any of the foregoing gas turbine engine embodiments, the common attachment point includes a fastener that extends through an aperture established in flange of the compressor hub, and an aperture established in a flange of the first shaft.

A turbine engine assembly according to an exemplary embodiment of the present disclosure includes, among other things, a turbine shaft that is rotated by a turbine of a gas turbine engine, at least one compressor hub that is rotated by the turbine shaft. The at least one compressor hub within a compressor section of the gas turbine engine. The assembly includes a compressor shaft that is rotatably driven by the turbine shaft, and a epicyclic gear train that is driven by the compressor shaft. The at least one compressor hub and the compressor shaft are rotatably coupled to the turbine shaft at a common attachment point.

In a further non-limiting embodiment of the foregoing gas turbine engine embodiment, the epicyclic gear train includes a carrier having spaced apart walls with circumferentially spaced mounts interconnecting the walls. The mounts provide circumferentially spaced apart apertures between the mounts at an outer circumference of the carrier. A sun gear and intermediate gears are arranged about and intermeshing with the sun gear. The intermediate gears are supported by the carrier.

In a further non-limiting embodiment of either of the foregoing gas turbine engine embodiments, baffles are arranged between the walls near the mounts. The baffles are secured to at least one of the walls and the mounts by a fastening element, gear pockets are provided between the baffles, and the baffles including a lubrication passage terminating at least one of the gear pockets.

In a further non-limiting embodiment of any of the foregoing gas turbine engine embodiments. The epicyclic gear train rotatably drives a fan shaft. Torque is transferred from the turbine shaft to the compressor shaft and from the turbine shaft to the compressor hub exclusively through the common attachment point.

A method of operating a gas turbine engine according to an exemplary aspect of the present disclosure includes, among other possible things, applying torque to an epicyclic gear train of a gas turbine engine by rotating a turbine shaft using a turbine section of a gas turbine engine, rotating a compressor hub using the turbine shaft, and rotating a compressor shaft with the turbine shaft. The compressor shaft is configured to rotate an epicyclic gear train. The first shaft is secured to the compressor hub and the compressor shaft at a common attachment point.

In a further non-limiting embodiment of the foregoing method, the method includes rotating a fan shaft with the epicyclic gear train.

These and other features of the present invention can be best understood from the following specification and drawings, the following of which is a brief description.

DETAILED DESCRIPTION OF THE PREFERRED EMBODIMENT

Figure 1:
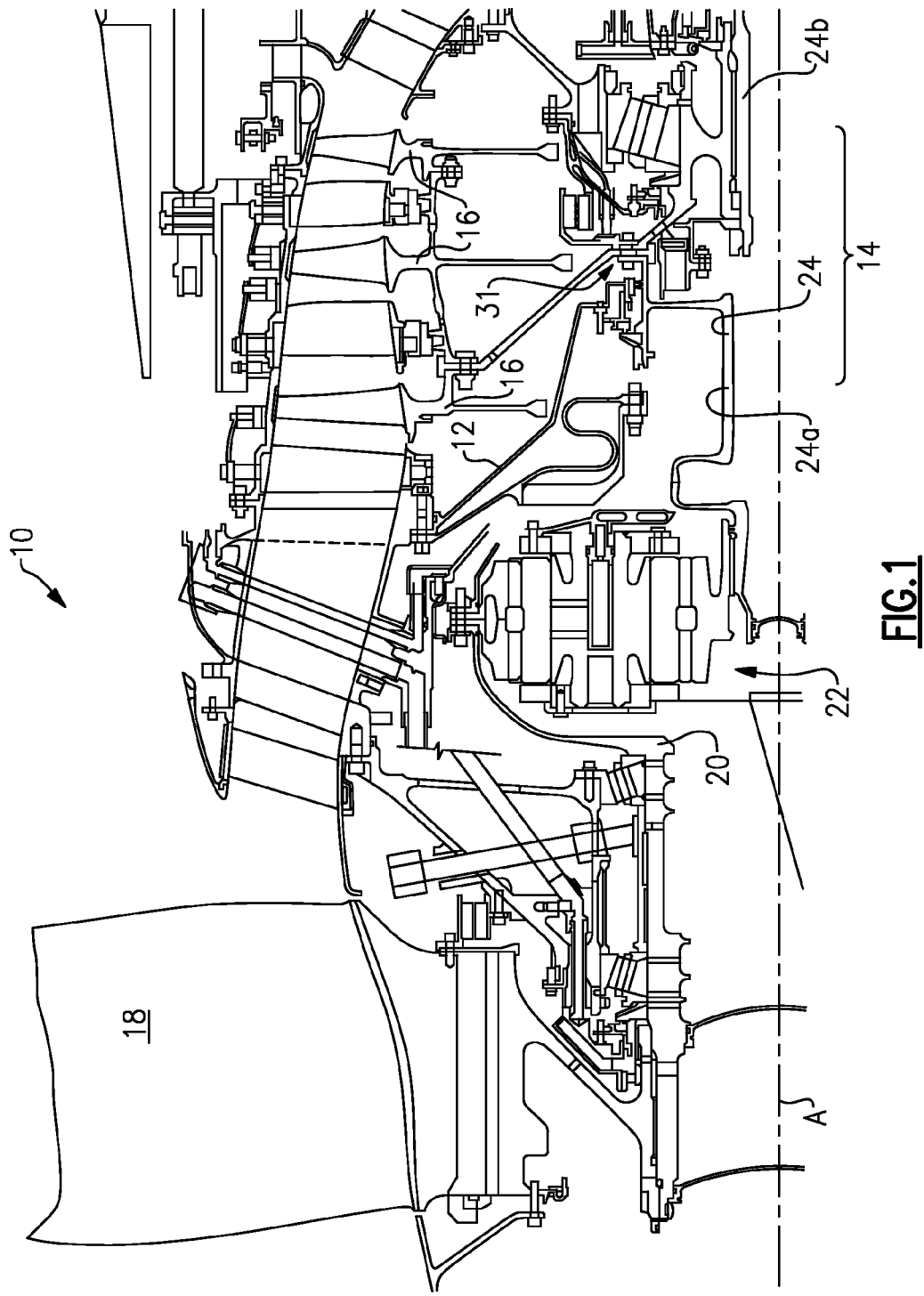
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft (not shown) about an axis A. A turbo fan 18 is supported on a turbo fan shaft 20 that is driven by a compressor shaft 24, which supports the compressor hubs 16, through an epicyclic gear train 22.

Figure 2:
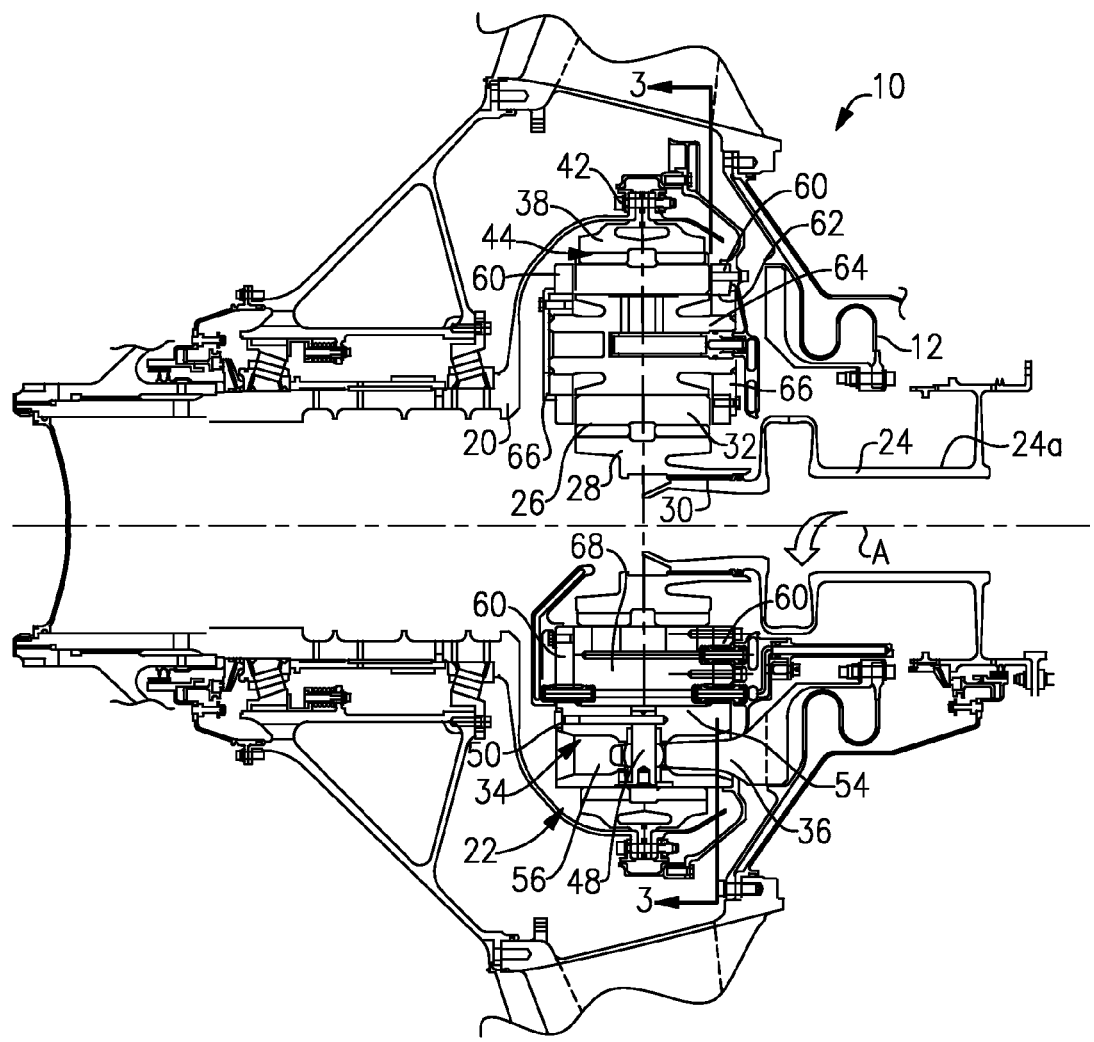
FIG. 2 is a cross-sectional view of the epicyclic gear train shown in FIG. 1.

In the example arrangement shown, the epicyclic gear train 22 is a star gear train. Of course, the claimed invention also applies to other epicyclic gear trains such as a planetary arrangement. Referring to FIG. 2, the epicyclic gear train 22 includes a sun gear 28 that is connected to the compressor shaft 24, which provides rotational input, by a splined connection 30.

In the example arrangement shown, the compressor shaft is a two-part shaft having a first shaft 24a and a second shaft 24b. The first shaft 24a is connected to the second shaft 24b via a connection member 31, which is a bolt and nut in this example.

A carrier 34 is fixed to the housing 12 by a torque frame 36. The carrier 34 supports intermediate gears (which are star gears 32 in the arrangement shown) that are coupled to the sun gear 28 by meshed interfaces 26 between the teeth of the sun and star gears 28, 32. A ring gear 38 surrounds the carrier 34 and is coupled to the star gears 32 by meshed interfaces 44. The ring gear 38, which provides rotational output, is secured to the turbo fan shaft 20 by connection 42.

Figure 3:
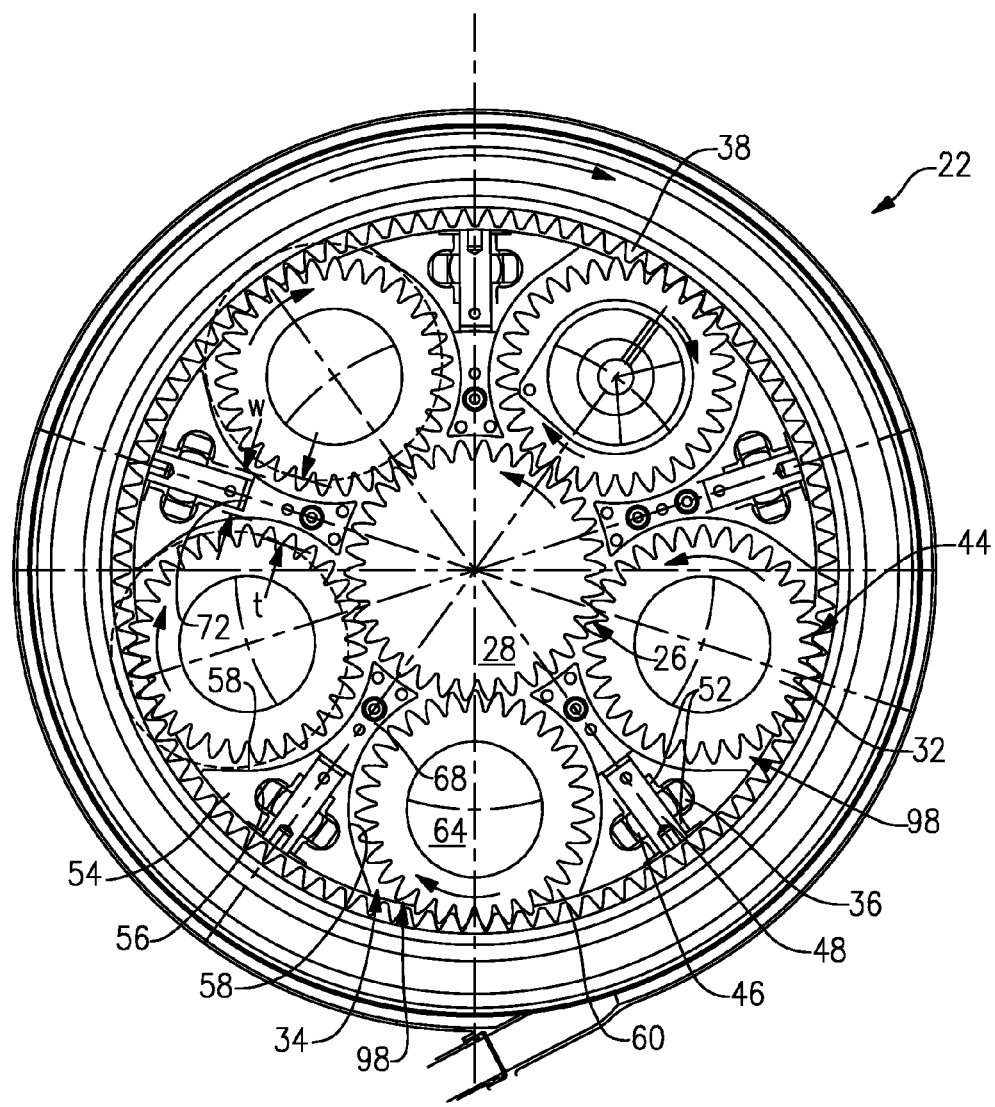
FIG. 3 is an end view of the epicyclic gear train taken along line 3-3 in FIG. 2 with a pair of star gears shown in phantom in an installation position.

In one example, the torque frame 36 grounds the carrier 34 to the housing 12 in a known manner. For example, mounts 53 have apertures 56 receiving fingers of the torque frame 36, as shown in FIGS. 2 and 3. Pins 48 that extend through spherical bearings 46 and bushings 52 secure the fingers to the carrier 34. Fasteners 50 retain the pins 48 to the carrier 34.

The carrier 34 is a unitary structure manufactured from one piece for improved structural rigidity and ease of assembly. The carrier 34 includes spaced apart side walls 60 that are interconnected by the mounts 54, which are generally wedge-shaped members, as best shown in FIG. 3. The mounts 54 and side walls 60 are unitary with one another. The mounts 54 have opposing curved surfaces 58 that are in close proximity to the star gears 32 and generally follow the curvature of the teeth of the star gears 32 so that any oil on the curved surfaces 58 will likely find its way to the star gears 32 for additional lubrication.

The mounts 54 are circumferentially spaced about the carrier 34 to provide apertures 98 through which the star gears 32 extend to engage the ring gear 38. Returning to FIG. 2, the side walls 60 include holes 62 for receiving a journal bearing 64 that supports each of the star gears 32. Each journal bearing 64 is retained within the carrier 34 by retainers 66 fastened to the side walls 60.

Figure 4:
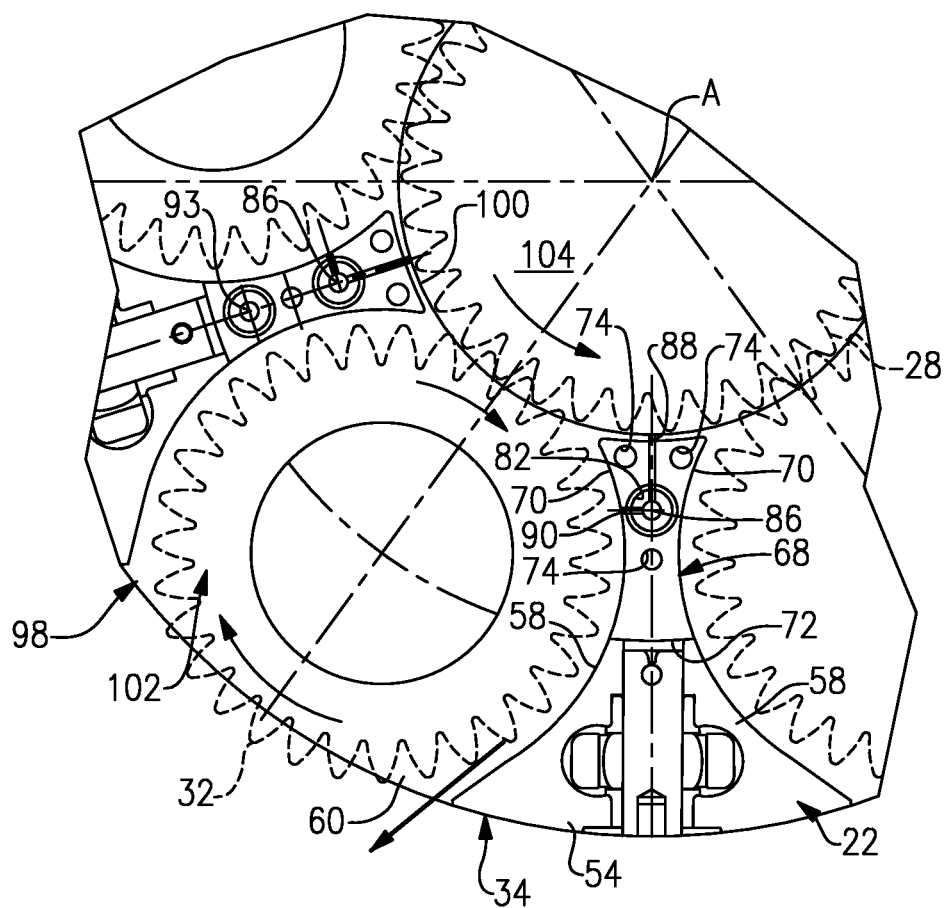
FIG. 4 is an enlarged view of a portion of the epicyclic gear train shown in FIG. 3 with a sun gear and star gears shown in phantom.
Figure 5:
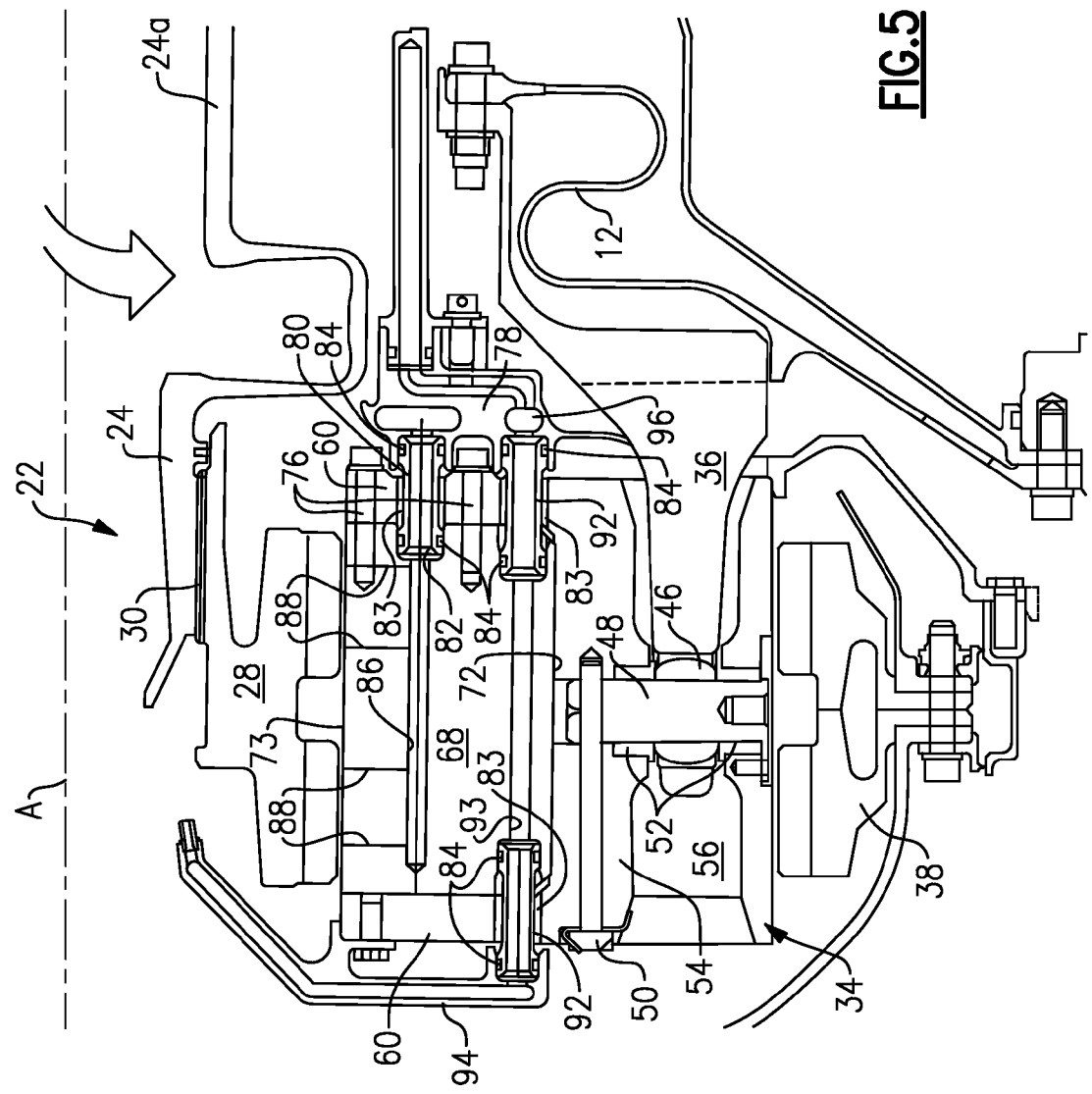
FIG. 5 is an enlarged view of a portion of the epicyclic gear train shown in FIG. 2.

Oil baffles 68 are arranged between the side walls 60 near each of the mounts 54, best shown in FIG. 2. Referring to FIGS. 4 and 5, the baffles 68 include ends 72 that abut the mounts 54, in the example shown. The baffles 68 also include opposing curved surfaces 70 arranged in close proximity to the star gears 28. The curved surfaces 58, 70 are contiguous with and adjoin one another, in the example shown, and provide gear pockets 102 that receive the star gears 32. A gear pocket 104, which receives the sun gear 28, is also provided between a surface 73 on each of the baffles 68 opposite the ends 72.

In one example, one of the side walls 60 includes holes 74 that receive fasteners 76 which secure each of the baffles 68 to the carrier 34. The baffles 68 include a lubrication passage provided by a primary passage 86 that fluidly communicates with a lubricant distributor 78. The lubricant distributor 78 is fed oil from a lubricant supply 96. In one example, the baffles 68 include openings 82 that receive a tube 80 extending through a hole 83 in the side wall 60. Seals 84 seal the tube 80 to the opening 82 and lubricant distributor 78. Other tubes 92 having seals 84 are used to provide oil to an external spray bar 94 through another lubrication passage (spray bar passage 93 that extends through one of the baffles 68). The external spray bar 94 is secured to the carrier 34 and sprays oil in the vicinity of the sun gear 28 near the splined connection 30 (shown in FIGS. 2 and 5).

The primary passage 86 is in communication with first and second passages 88, 90 that spray oil on the teeth of the sun and star gears 28, 32. In the example shown, the first and second passages 88, 90 are arranged ninety degrees from one another.

With the example baffles 68, lubricant distribution is integrated into the baffle so that separate components are eliminated. The baffles 68 can be constructed from a different, lighter weight material than the carrier 34.

The example carrier 34 can be constructed from one piece, which improves the structural integrity of the carrier. A central opening 100 is machined in at least one of the side walls 60 and provides the gear pocket 104. Gear pockets 102 are machined between the side walls 60 and mounts 54 for each of the star gears 32 and form apertures 98 at an outer circumference of the carrier 34. Referring to FIG. 3, the star gears 32 are inserted into the central opening 100 and moved radially outwardly so that they extend through the apertures 98 and are preferably in abutment with the mounts 54 (position indicated by dashed lines in FIG. 3). In this position, there is an adequate gap, t, between the teeth of adjacent star gears 32 to accommodate a width, w, of the end 72 of the baffles 68. Once the baffles 68 have been inserted, the star gears 32 can be repositioned, as shown by the solid lines, and the sun gear 28 can be inserted into the central opening 100 so that it meshes with the star gears 32. The baffles 68 are secured to the carrier 34 using fasteners 76. The tubes 80, 92 can be inserted and the rest of the lubricant distribution system can be connected.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine assembly comprising:
   a first shaft that is rotatably driven by a second shaft of a gas turbine engine;
   a compressor hub driven by the first shaft, the compressor hub within a compressor section of the gas turbine engine;
   an epicyclic gear train that is driven by the first shaft; and
   a common attachment point that secures the first shaft and the compressor hub to the second shaft.

2. The turbine engine assembly of claim 1, including an epicyclic gear train having:
   a carrier, and
   a sun gear and intermediate gears arranged about and intermeshing with the sun gear, the intermediate gears supported by the carrier.

3. The turbine engine assembly of claim 2, including a baffle secured to the carrier by a fastening member, the baffle including a lubrication passage near at least one of the sun gear and intermediate gears for directing lubricant on the at least one of the sun gear and intermediate gears.

4. The turbine engine assembly of claim 2, comprising a ring gear intermeshing with the intermediate gears and a third shaft interconnected to the ring gear, and the first shaft interconnected to the sun gear.

5. The turbine engine assembly of claim 4, wherein the carrier is fixed relative to a housing, the third shaft drives a turbo fan, and the first shaft supports a compressor hub having compressor blades.

6. The turbine engine assembly of claim 1, wherein the first shaft is a compressor shaft.

7. The turbine engine assembly of claim 1, wherein the epicyclic gear train rotatably drives a third shaft.

8. The turbine engine assembly of claim 7, including roller bearings that support the third shaft.

9. The turbine engine assembly of claim 7, wherein the third shaft is a fan shaft.

10. The turbine engine assembly of claim 1, wherein the second shaft is turbine shaft.

11. The turbine engine assembly of claim 1, wherein the compressor hub includes blades.

12. The turbine engine assembly of claim 1, wherein torque is transferred to the first shaft and the compressor hub exclusively through the common attachment point.

13. The turbine engine assembly of claim 1, wherein the common attachment point includes a fastener that extends through an aperture established in flange of the compressor hub, and an aperture established in a flange of the first shaft.

14. A turbine engine assembly comprising:
   a turbine shaft that is rotated by a turbine of a gas turbine engine;
   at least one compressor hub that is rotated by the turbine shaft, the at least one compressor hub within a compressor section of the gas turbine engine;
   a compressor shaft that is rotatably driven by the turbine shaft, and
   a epicyclic gear train that is driven by the compressor shaft, wherein the at least one compressor hub and the compressor shaft are rotatably coupled to the turbine shaft at a common attachment point.

15. The turbine engine of claim 14, wherein the epicyclic gear train includes
   a carrier having spaced apart walls with circumferentially spaced mounts interconnecting the walls, the mounts providing circumferentially spaced apart apertures between the mounts at an outer circumference of the carrier, and
   a sun gear and intermediate gears arranged about and intermeshing with the sun gear, the intermediate gears supported by the carrier.

16. The turbine engine assembly of claim 15, including baffles arranged between the walls near the mounts, the baffles secured to at least one of the walls and the mounts by a fastening element, gear pockets provided between the baffles, and the baffles including a lubrication passage terminating at least one of the gear pockets.

17. The turbine engine assembly of claim 14, wherein the epicyclic gear train rotatably drives a fan shaft.

18. The turbine engine assembly of claim 14, wherein torque is transferred from the turbine shaft to the compressor shaft and from the turbine shaft to the compressor hub exclusively through the common attachment point.

19. A method of applying torque to an epicyclic gear train of a gas turbine engine comprising:
   a) rotating a turbine shaft using a turbine section of a gas turbine engine;
   b) rotating a compressor hub using the turbine shaft; and
   c) rotating a compressor shaft with the turbine shaft, the compressor shaft configured to rotate an epicyclic gear train, wherein the first shaft is secured to the compressor hub and the compressor shaft at a common attachment point.

20. The method of claim 19 including rotating a fan shaft with the epicyclic gear train.

21. A turbine engine assembly comprising:
   a compressor hub and a two-part compressor shaft, containing an aft part and a forward part, the forward part connected to an epicyclical gear train and the aft part driven by an engine core shaft; wherein a compressor hub and two-part shaft are connected at a common joint.

22. The turbine engine assembly of claim 21, wherein the engine core shaft is a turbine section shaft.

23. The turbine engine assembly of claim 21, wherein the common joint is configured to transfer torque from the aft part to both the forward part and the compressor hub.

24. The turbine engine assembly of claim 23, wherein torque is transferred from the aft part to both the forward part and the compressor hub exclusively through the common joint.

* * * * *

UNITED STATES PATENT AND TRADEMARK OFFICE
CERTIFICATE OF CORRECTION

| | | |
|---|---|---|
| PATENT NO. | : 8,640,336 B2 | Page 1 of 1 |
| APPLICATION NO. | : 13/346790 | |
| DATED | : February 4, 2014 | |
| INVENTOR(S) | : Sheridan et al. | |

It is certified that error appears in the above-identified patent and that said Letters Patent is hereby corrected as shown below:

IN THE CLAIMS:

Claim 13, column 6, line 1: after *in* insert --a--

Claim 21, column 6, line 52: delete "a" and replace with --the--

Signed and Sealed this
Twenty-seventh Day of May, 2014

Michelle K. Lee
*Deputy Director of the United States Patent and Trademark Office*